(12) United States Patent
Le et al.

(10) Patent No.: US 11,811,708 B2
(45) Date of Patent: Nov. 7, 2023

(54) SYSTEMS AND METHODS FOR GENERATING DYNAMIC CONVERSATIONAL RESPONSES USING CLUSTER-LEVEL COLLABORATIVE FILTERING MATRICES

(71) Applicant: Capital One Services, LLC, McLean, VA (US)

(72) Inventors: Minh Le, McLean, VA (US); Arturo Hernandez Zeledon, McLean, VA (US); Md Arafat Hossain Khan, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/492,157

(22) Filed: Oct. 1, 2021

(65) Prior Publication Data

US 2023/0108469 A1 Apr. 6, 2023

(51) Int. Cl.
*H04L 51/02* (2022.01)
*G06F 16/9535* (2019.01)
*G06F 18/2321* (2023.01)

(52) U.S. Cl.
CPC .......... *H04L 51/02* (2013.01); *G06F 16/9535* (2019.01); *G06F 18/2321* (2023.01)

(58) Field of Classification Search
None
See application file for complete search history.

(56) References Cited

U.S. PATENT DOCUMENTS

| | | |
|---|---|---|
| 2018/0018569 A1* | 1/2018 | Roitman ................. G06N 5/04 |
| 2018/0189417 A1* | 7/2018 | Freed ................... G06K 9/6218 |
| 2021/0097110 A1* | 4/2021 | Asthana ............ G06F 16/90332 |

* cited by examiner

*Primary Examiner* — Kevin S Mai
(74) *Attorney, Agent, or Firm* — Perkins Coie LLP

(57) ABSTRACT

Methods and systems disclosed herein collect user data in real-time and organize them (e.g., using a collaborative filtering matrix) into groups (e.g., cluster assignments). The system then determines statistical distributions of observed real-time intents (e.g., based on actual selections made by users) for each group. The system then merges this distribution with existing model predictions (e.g., a model trained on historical training data) to balance between historical and dynamically updated information.

16 Claims, 5 Drawing Sheets

SYSTEMS AND METHODS FOR GENERATING DYNAMIC CONVERSATIONAL RESPONSES USING CLUSTER-LEVEL COLLABORATIVE FILTERING MATRICES

BACKGROUND

In recent years, the amount and uses of interactive programs has risen considerably. In tandem with this rise, is the need to have human-like interactions and/or create applications that mimic the tone, cadence, and speech patterns of humans. Additionally, in order to fulfill user-interaction requirements, these applications need to be helpful, and thus respond intelligently by providing relevant responses to user inputs, whether these inputs are received via text, audio, or video input.

SUMMARY

Methods and systems are described herein for generating dynamic conversational responses. Conversational responses include communications between a user and a system that may maintain a conversational tone, cadence, or speech pattern of a human during an interactive exchange between the user and the system. The interactive exchange may include the system responding to one or more user actions (which may include user inactions) and/or predicting responses prior to receiving a user action. In order to maintain the conversational interaction during the exchange, the system may advantageously generate responses that are both timely and pertinent (e.g., in a dynamic fashion). This requires the system to determine both quickly (i.e., in real-time or near real-time) and accurately the intent, goal, or motivation behind a user input. These user input or actions may take various forms including speech commands, textual inputs, responses to system queries, and/or other user actions (e.g., logging into a mobile application of the system). In each case, the system may aggregate information about the user action, information about the user, and/or other circumstances related to the user action (e.g., time of day, previous user actions, current account settings, etc.) in order to determine a likely intent of the user.

In order to determine the likely intent and generate a dynamic conversational response that is both timely and pertinent, the methods and systems herein use one or more machine learning models and/or other artificial intelligence based models (referred to herein collectively). However, the use of these models presents fundamental problems. First, in order to have information processed by a model, the system needs to create a feature input that may be processed by the model. For example, aggregated information about the user action, information about the user, and/or other circumstances related to the user action (e.g., time of day, previous user actions, current account settings, etc.) may be used to generate a feature input (e.g., a vector of data) that expresses the information quantitatively or qualitatively. However, feature inputs for similar intents (e.g., a first intent of a user to learn about a first set of information and a second intent of a user to learn about a second set of information) may have similar feature inputs as much of the underlying aggregated information may be the same. This is particularly prevalent in generating dynamic conversational responses as the system must respond with specificity, as responding too generally is more unnatural and frustrating for a user.

Second, machine learning models require training in order to "learn" how to respond based on a feature input. For example, training data for a machine learning model may include known intents and labeled feature inputs corresponding to a respective known intent. In order to prevent problems arising due to a sparsity in the training data (and thus leading to a less precise model), training data is retrieved over a long period of time. However, the use of data spanning a long period of time is only useful if the training data continues to accurately reflect the intents of the user. That is, this creates an additional problem in that despite the large amounts of data, if new information is statistically different from the learning batch, the predictions trained by the model become impaired. For example, if recent trends or changes to the user cause historic training data to become obsolete or inaccurate, then the model becomes inaccurate as well. A conventional approach to handling this problem may be to exclude historic data past a certain age from the training data set. This in turn risks limiting the available training data (e.g., leading to less precision and increased data sparsity), but also removes training data that may be useful when a trend is over and/or a user returns to historic norms.

To overcome these technical challenges, the methods and systems disclosed herein collects user data in real-time and organizes them (e.g., using collaborative filtering matrices) into groups (e.g., clusters). The system then determines statistical distributions of observed real-time intents (e.g., based on actual selections made by users) for each group. The system then merges this distribution with existing model predictions (e.g., a model trained on historical training data) to balance between historical and dynamically updated information. To overcome the technical challenge of feature inputs having similar data for multiple intents, the system uses a collaborative filtering matrix of intent probabilities for cluster assignments. That is, the system provides a distribution of intent probabilities across intents and categorized by cluster assignments. To overcome the technical challenge of current data exhibiting transient behaviors different from historic data, which leads to a drop in prediction accuracy, the system balances predictions based on both the collaborative filtering matrix (e.g., corresponding to current data) and a distribution of probable intents (e.g., corresponding to historic data). The system then generates a weighted average of the collaborative filtering matrix and the distribution based on whether a probable intent of the user is more likely to match a current or historic trend.

In some aspects, methods and systems are disclosed for generating dynamic conversational responses using cluster-level collaborative filtering matrices. For example, the system may receive user data in response to a user interacting with a user interface, wherein the user data is multi-modal data. The system may determine a user cluster assignment for the user based on the user data. The system may determine a collaborative filtering matrix of intent probabilities for cluster assignments, wherein the collaborative filtering matrix is based on actual intents of a subset of users. The system may determine, for the user, a distribution of probable intents from a plurality of distributions of probable intents based on the user data, wherein the plurality of distributions of probable intents are based on actual intents of users having one of a plurality of cluster assignments over a time period. The system may determine a first probable intent of the user based on a weighted average of the collaborative filtering matrix and the distribution. The system may generate for display, on the user interface, a first dynamic conversational response based on the first probable intent of the user.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
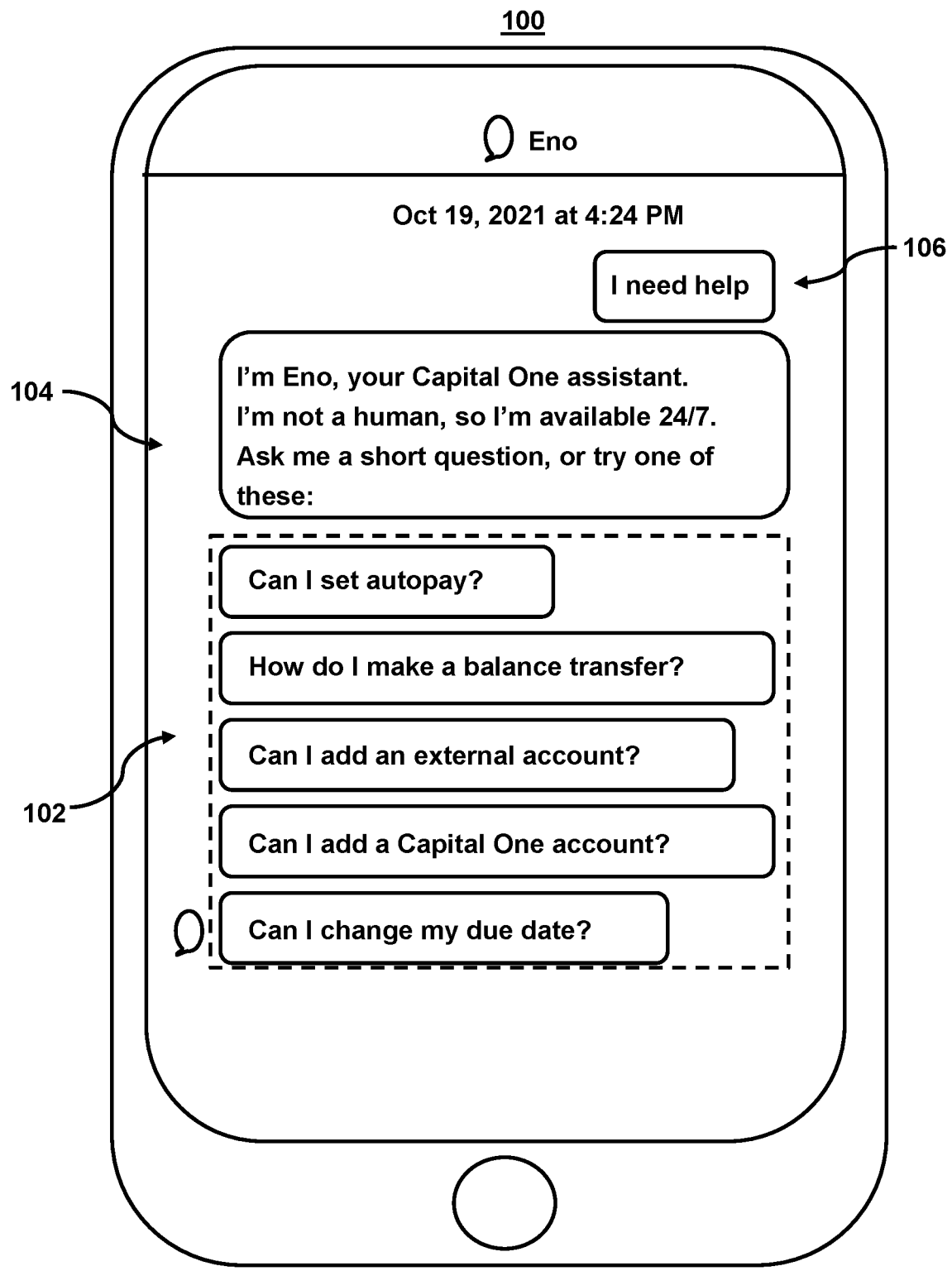
FIG. 1 shows an illustrative user interface for presenting dynamic conversational responses using machine learning models, in accordance with one or more embodiments.

FIG. 1 shows an illustrative user interface for presenting dynamic conversational responses using machine learning models, in accordance with one or more embodiments. As discussed above, the system solves the technical problem of identifying sudden shifts in user intents (e.g., indicating a change in normal trends) in machine learning models that are trained on historic data, which may not be sensitive to the sudden shifts. The solution to this technical problem may be embodied in determining a first probable intent of the user based on a weighted average of a collaborative filtering matrix (e.g., trained on dynamic data) and a distribution of probable intents (e.g., trained on historic data). Solving this technical problem provides the practical benefit of allowing the machine learning model to detect new trends and reverting back to historic norms without compromising the model.

For example, FIG. 1 shows user interface 100. The system (e.g., a mobile application) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more mediums (e.g., text, video, audio, etc.). For example, the system may use one or more artificial intelligence models (including machine learning models, neural networks, etc.) referred to here collectively as "models."

In order to maintain the conversational interaction, the system may need to generate responses (e.g., conversational response) dynamically and/or in substantially real-time. For example, the system may generate responses within the normal cadence of a conversation. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user.

For example, in response to a user action, which in some embodiments may comprise a user logging onto an application that generates user interface 100, inputting a query (e.g., query 106) into user interface 100, and/or a prior action (or lack thereof) by a user to a prior response generated by the system, the system may take one or more steps to generate dynamic conversational responses (e.g., response 104). These steps may include retrieving data about the user, retrieving data from other sources, monitoring user actions, and/or other steps in order to generate a feature input (e.g., as discussed below). In some embodiments, the system may generate a plurality of responses (e.g., responses 102).

In some embodiments, the feature input may include a vector that describes various information about a user, a user action, and/or a current or previous interaction with the user. The system may further select the information for inclusion in the feature input based on a predictive value. The information may be collected actively or passively by the system and compiled into a user profile.

In some embodiments, the information (e.g., a user action) may include conversation details, such as information about a current session, including a channel or platform, e.g. desktop web, iOS, or mobile, a launch page (e.g., the webpage that the application was launched from), a time of launch, and/or activities in a current or previous session before launching the application. The system may store this information and all the data about a conversational interaction may be available in real-time via HTTP messages and/or through data streaming or from more sources (e.g., via an API).

In some embodiments, the information (e.g., a user action) may include user account information such as types of accounts the user has, other accounts on file, such as bank accounts for payment, information associated with accounts, such as credit limit, current balance, due date, recent payments, or recent transactions. The system may obtain this data in real-time for model prediction through enterprise APIs.

In some embodiments, the information (e.g., a user action) may include insights about users provided to the application (e.g., via an API) from one or more sources, such as a qualitative or quantitative representations (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

Figure 2:
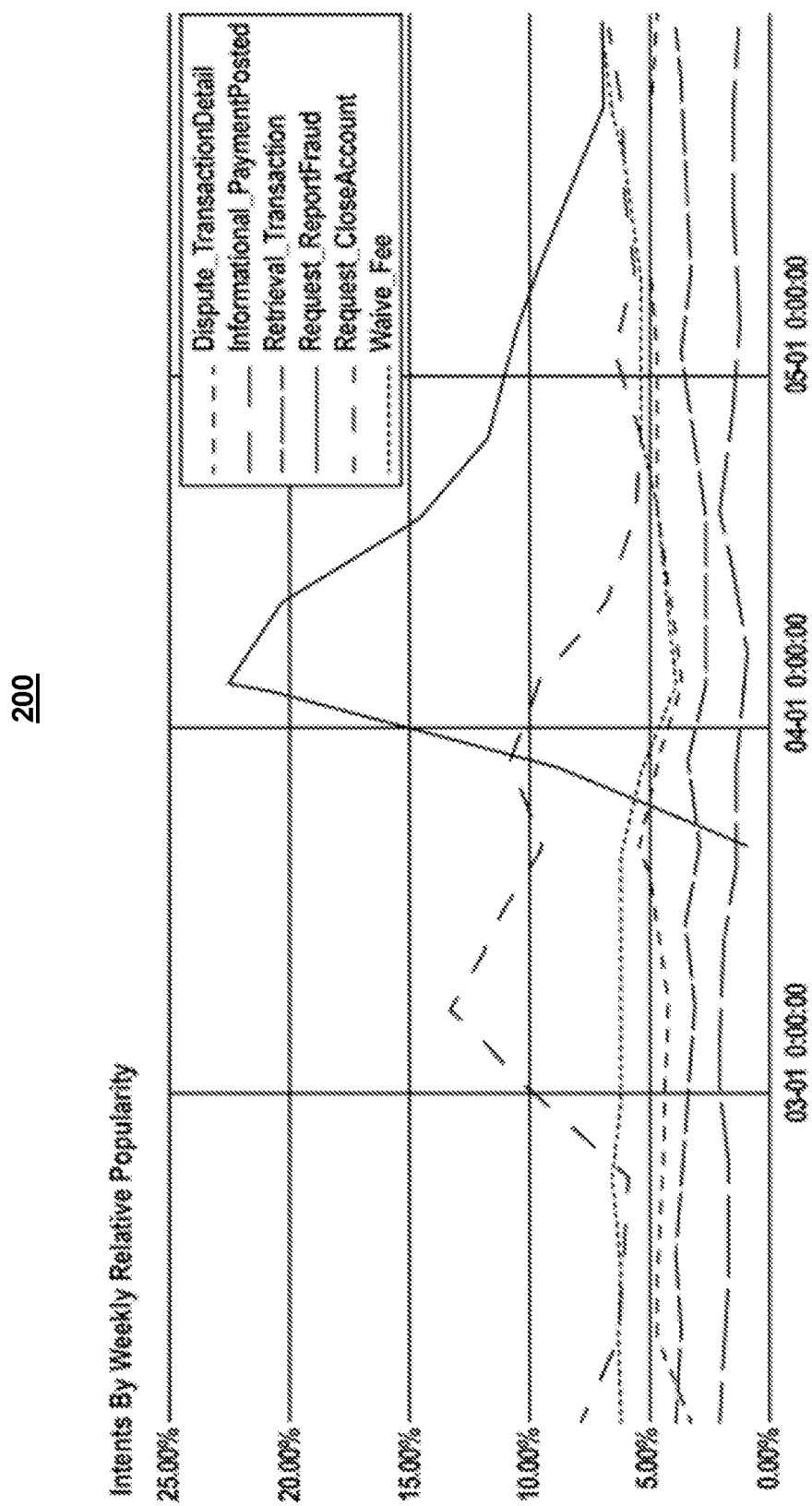
FIG. 2 shows illustrative diagrams for how historical and dynamically updated information is used for generating dynamic conversational responses, in accordance with one or more embodiments.

FIG. 2 shows illustrative diagrams for how historical and dynamically updated information is used for generating dynamic conversational responses, in accordance with one or more embodiments. Diagram 200 illustrates various user intents by a weekly popularity over a given time period. For example, as shown in diagram 200, user intents for during the first week of April (e.g., "04-01") dramatically increased for intents related to fraud. For example, this week may have corresponded to a news report related to a cybersecurity breach that resulted in widespread fraud. Notably, the presence of the spike in user intents may be missed by conventional machine learning models, as those models may be trained on data sets that did not feature dramatic spikes in user intents related to fraud. As such, the machine learning models are not trained to detect real-time updates and/or a surge in user intents based on real-time changes.

Furthermore, if the training data featuring the surge is simply incorporated into the training data set for the machine learning model, the future predictions of the machine learning model will be biased. For example, the model will be trained to expect dramatic spikes in user intents related to fraud to occur in the future based on this presence of the one-time spike. Thus, conventional models (e.g., those trained using conventional training mechanisms and/or with conventional architectures) fail to both identify dramatic changes at the time of the dramatic change and will be biased in future predictions.

To overcome this problem, the methods and systems disclosed herein collect user data in real-time and organize them (e.g., using collaborative filtering) into groups (e.g., clusters). For example, the system may identify characteristics of particular users (e.g., demographics, geographic area, previous interactions, etc.) and determine the actual intent of a user over a recent time period. For example, the system may determine the actual intent of users. The system may do this based on a user selection of a response of a plurality of responses (e.g., responses 102 (FIG. 1)), in which each response corresponds to a given user intent. The system may then compare characteristics of users to determine a category of users that are likely to have a given intent.

In some embodiments, the system may use collaborative filtering. For example, the system may filter information or patterns using techniques involving collaboration among multiple agents, viewpoints, data sources, etc. That is, the system may make automatic predictions (e.g., filtering) about the interests of a user by collecting preferences or taste information from many users (e.g., collaborating). In some embodiments, the system may use a memory-based approach for collaborative filtering, in which the system uses user rating data to compute the similarity between users and/or characteristics of users. For example, the system may use a neighborhood-based collaborative filtering approach and/or intent-based/user-based top-N recommendations approach. Notably, this approach has a high level of interpretability (e.g., the ability to determine the value of different characteristics in the filtering) of the results. Additionally, this approach is both easy to create and to use, but also makes it easy to facilitate new data. This ease of use may aid in incorporating the new data in real-time as described herein. It should also be noted that the memory data structure used for implementing the collaborative filtering may be updated as additional inputs (e.g., user selection indicating actual user intents) are received.

For example, in user-based approaches, the system generates a probability rating, r, of an intent, i, of a user, u, based on an aggregation of other users' intent:

$$r_{u,i} = \text{aggr}_{u' \in U} r_{u',i}$$

In such cases, where U denotes the set of top N users that are most similar to user, u, who had an intent, i. Some examples of the aggregation function include:

$$r_{u,i} = \frac{1}{N} \sum_{u' \in U} r_{u',i}$$

$$r_{u,i} = k \sum_{u' \in U} (u, u') r_{u',i}$$

where k is a normalizing factor defined as:

$$k = 1 / \sum_{u' \in U} |(u, u')|$$

$$r_{u,i} = \underline{r_u} + k \sum_{u' \in U} (u, u')(r_{u',i} - \underline{r_{u'}})$$

where $\underline{r_{u'}}$ is the average rating of user u for all the items rated by u. The neighborhood-based algorithm calculates the similarity between two users, and the system may then produce a prediction for the user by taking the weighted average of all the ratings. The system may then compare similarity between users through the use of Pearson correlation and vector cosine.

Additionally or alternatively, the system may use a model based approach that uses one or more collaborative filtering models (e.g., including Bayesian networks, clustering models, latent semantic models such as singular value decomposition, probabilistic latent semantic analysis, multiple multiplicative factor, latent Dirichlet allocation, and/or Markov decision process based models). The system may also use latent models (e.g., dimensionally reduced versions of the model) in order to reduce the processing time and power required to cluster users. For example, reducing the processing time and power required allows for the system to be used for generating real-time results and/or allowing the system to be run on a mobile device.

The systems described may also use a hybrid collaborative filtering approach (e.g., a combination of the memory-based approach and a model-based approach). For example, the system may use a hybrid of intents-based and user-based similarities to cluster customers. Moreover, the system may use the memory-based algorithms, but as executed through one or more of the models described. The system may use collaborative filtering based on intents-based and user-based similarities by combining collaborative filtering based on intents similarities and collaborative filtering based on user similarities together. As such, the system may use collaborative filtering based on intents and users to analyze an intent-user matrix (e.g., a collaborative filtering matrix) to identify a correlation between an intent and user characteristic, generate similar intents for a given user (or user characteristic), and determine a number of available users for target intents.

The system may then use the hybrid collaborative filtering approach to organize users into clusters. The system may then derive a statistical distribution of observed real-time intents for each group. The system may then merge this distribution with existing predictions (e.g., based on a machine learning model trained on historical data) to balance between historical and dynamically updated information.

For example, "final prediction" data may act as a balance between a model based on historical predictions ("model predictions" or a "distribution of probable intents") and dynamically updated information (e.g., "collaborative filtering matrix predictions"). For example, to generate the "final prediction" data, the system divides customers into clusters using hybrid collaborative filtering. The system then determines each cluster's distribution of intents choices (e.g., as shown in FIG. 2) as recorded by group-wise dynamic intent predictions ("cluster_D2_intents_dist"). For each new user, the system determines intents probabilities using hybrid collaborative filtering based on the group-wise dynamic intent predictions ("HCF_D2 prediction"). The system then update an existing model (e.g., the historical model) using weighted average approach based on a weight, W:

$$\text{new\_RE\_predict} = \text{original\_RE\_prediction} \times W + \text{HCF\_D2\_prediction} \times (1-W)$$

The weight, W, may be algorithmically determined based on one or more factors. For example, the system may determine a number of users in the plurality of clusters and determine a weight to apply in the weighted average based on the number of users in the plurality of clusters. Alternatively or additionally, the system may determine a rate of change in the number (e.g., indicating a dramatic and sudden spike) and determine a weight to apply in the weighted average based on the rate of change in order to highlight real-time events. Alternatively or additionally, the system may determine a frequency of the intents and/or a historic popularity of the intent and determine a weight to apply in the weighted average based on the frequency of the intents and/or a historic popularity. The system may then generate a dynamic conversational response based on the predictions of the weighted average model.

In some embodiments, the system may then use in-memory caching to enable control on how many conversation points are stored for use in hybrid collaborative filtering. For example, the system may use Redis caching or Python native dictionary caching. The system may then utilize the stored hybrid collaborative filtering to filter data structure to apply the weighted average approach as described above on top of the model predictions for any new conversation or invocation of the model used to provide predictions.

Figure 3:
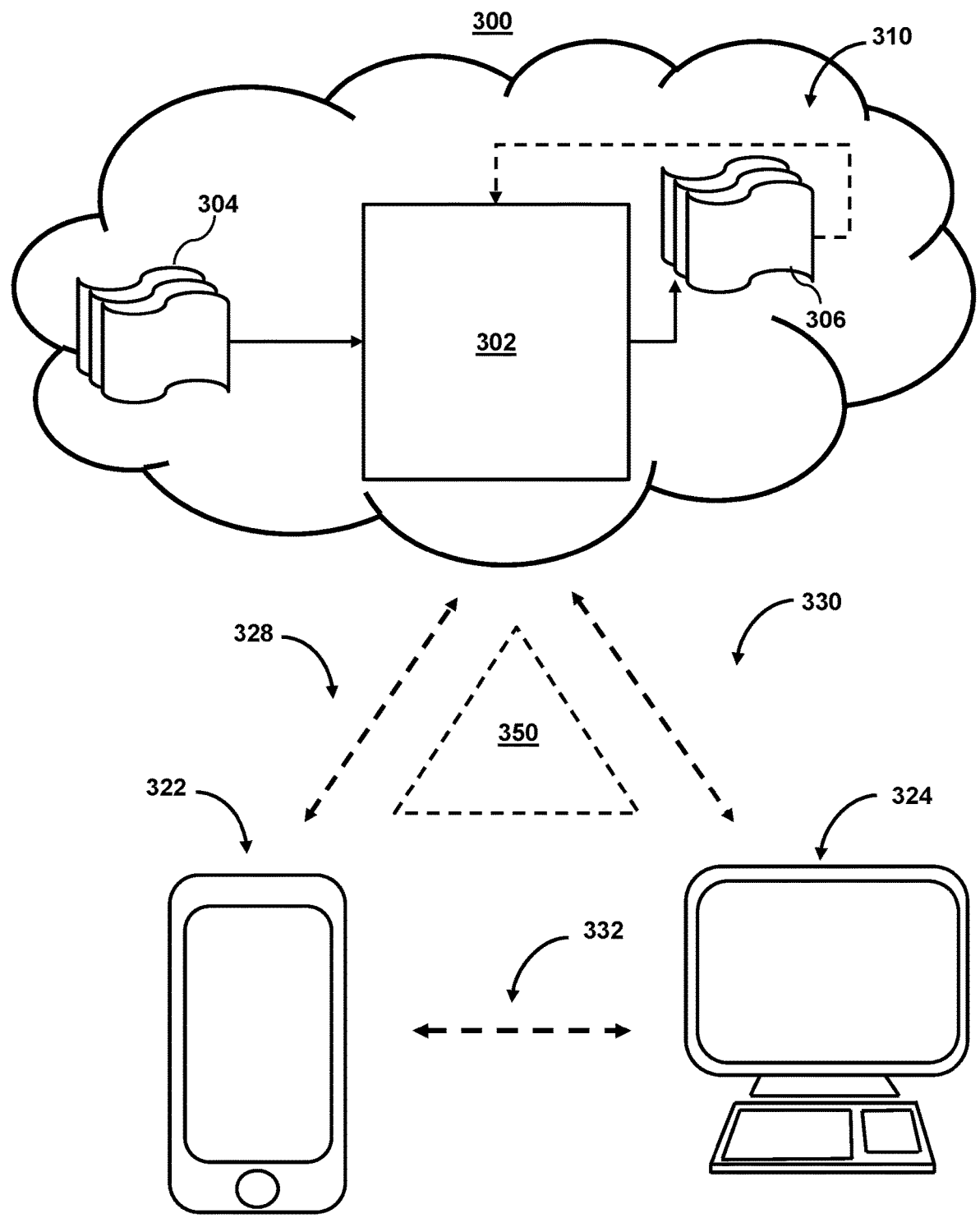
FIG. 3 shows illustrative system components for generating dynamic conversational responses based on historical and dynamically updated information, in accordance with one or more embodiments.

FIG. 3 shows illustrative system components for generating dynamic conversational responses based on historical and dynamically updated information, in accordance with one or more embodiments. For example, system 300 may represent the components used for generating dynamic conversational responses, as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices.

Users may, for instance, utilize one or more devices to interact with one another, one or more servers, or other components of system 300. It should be noted, that while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interface nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. For example, the user data may describe one or more characteristics of a user, a user device, and/or one or more interactions of the user with a user device and/or application generating responses, queries, and/or notifications. Alternatively, or additionally, the system may act as a clearing house for multiple sources of information about the user. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to run processes to determine alternative content. Cloud components 310 may also include cloud-based input/output circuitry configured to display alternative content.

Cloud components 310 may include model 302, which may be a machine learning model (e.g., as described in FIG. 3). Model 302 may take inputs 304 and provide outputs 306. The inputs may include multiple datasets, such as a training dataset and a test dataset. Each of the plurality of datasets (e.g., inputs 304) may include data subsets related to user data, predicted intents, and/or actual intents. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a user intent).

In some embodiments, model 302 may predict alternative content. For example, the system may determine that particular characteristics are more likely to be indicative of a prediction. In some embodiments, the model (e.g., model 302) may automatically perform actions based on outputs 306. In some embodiments, the model (e.g., model 302) may not perform any actions on a user's account. The output of the model (e.g., model 302) is only used to decide which location and/or delivery time offset to select.

System 300 also includes API layer 350. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use Developer Portal. API layer 350 may use strong security constraints applying WAF and DDoS protection, and API layer 350 may use RESTful APIs as standard for external integration.

Figure 4:
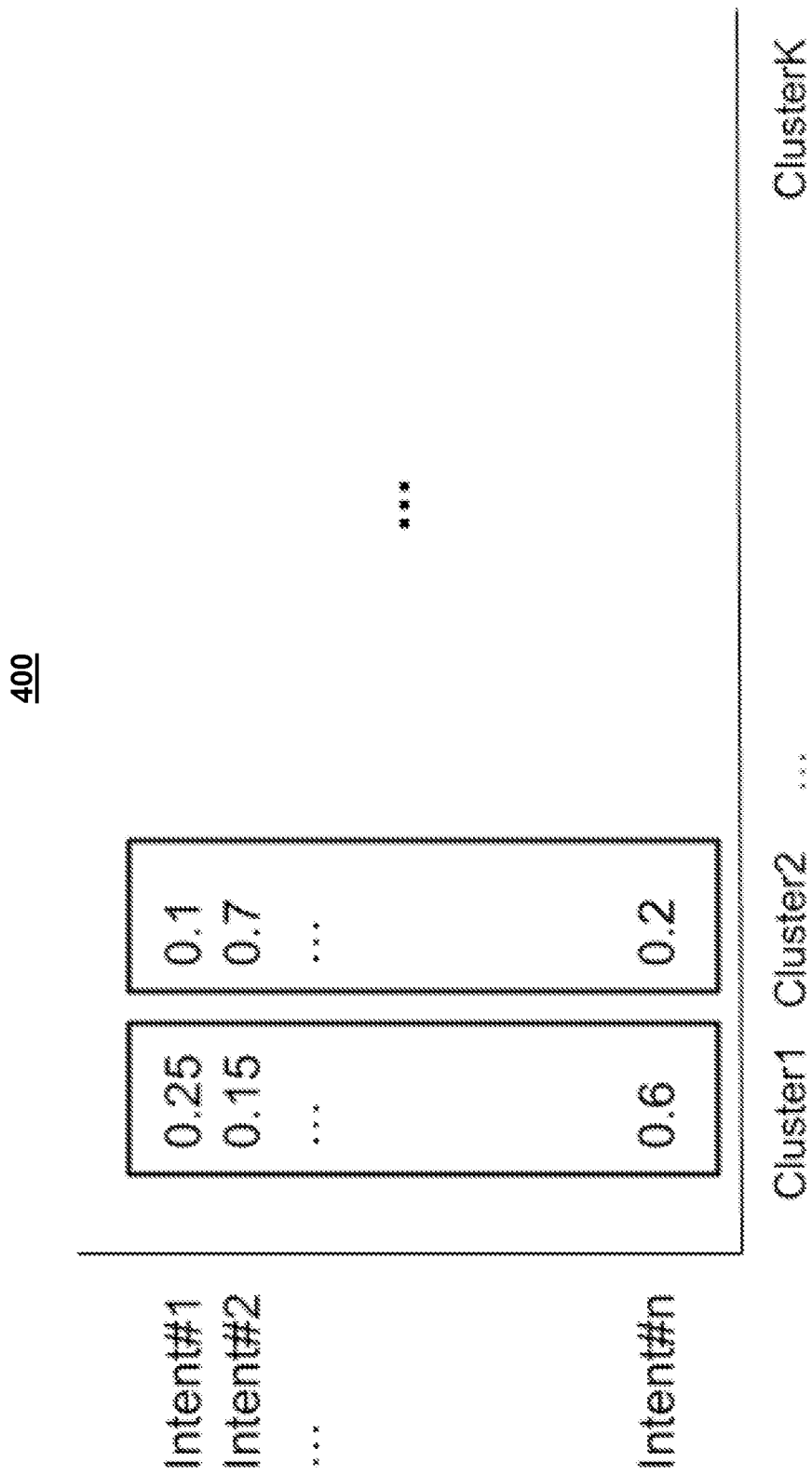
FIG. 4 shows an illustrative diagram for a collaborative filtering matrix of intent probabilities for cluster assignment, in accordance with one or more embodiments.

FIG. 4 shows an illustrative diagram for a collaborative filtering matrix of intent probabilities for cluster assignment, in accordance with one or more embodiments. For example, the system may use a dynamic moving window of recent user interactions to build a cluster-level collaborative filtering matrix. The window size may be empirically determined with infrastructure consideration (allowable memory size). For example, for a 10K-size window, records observed intents of the most recent 10K users. New user 10K+1th will replace the first user of the moving window.

As shown in FIG. 4, diagram 400 may represent a collaborative filtering matrix. In diagram 400, the X-axis represents the K clusters and Y-axis the intents-probabilities calculated from observed data and cluster-assignment probabilities. For example, in the collaborative filtering matrix, columns may represent collaborative filtering intent-prediction mapping for the cluster assignments. The system may continually update the collaborative filtering matrix as additional user intents are received (and a previous user intent is replaced with the newly received intent).

For example, for each user, the system updates the collaborative filtering matrix using the observed intent and clustering assignment. For example, the system may receive the cluster assignment probabilities vector and add a collaborative filtering column with this vector by adding this vector to the existing contents. The system may then normalize the updated columns to have a new summed-to-1 values.

Figure 5:
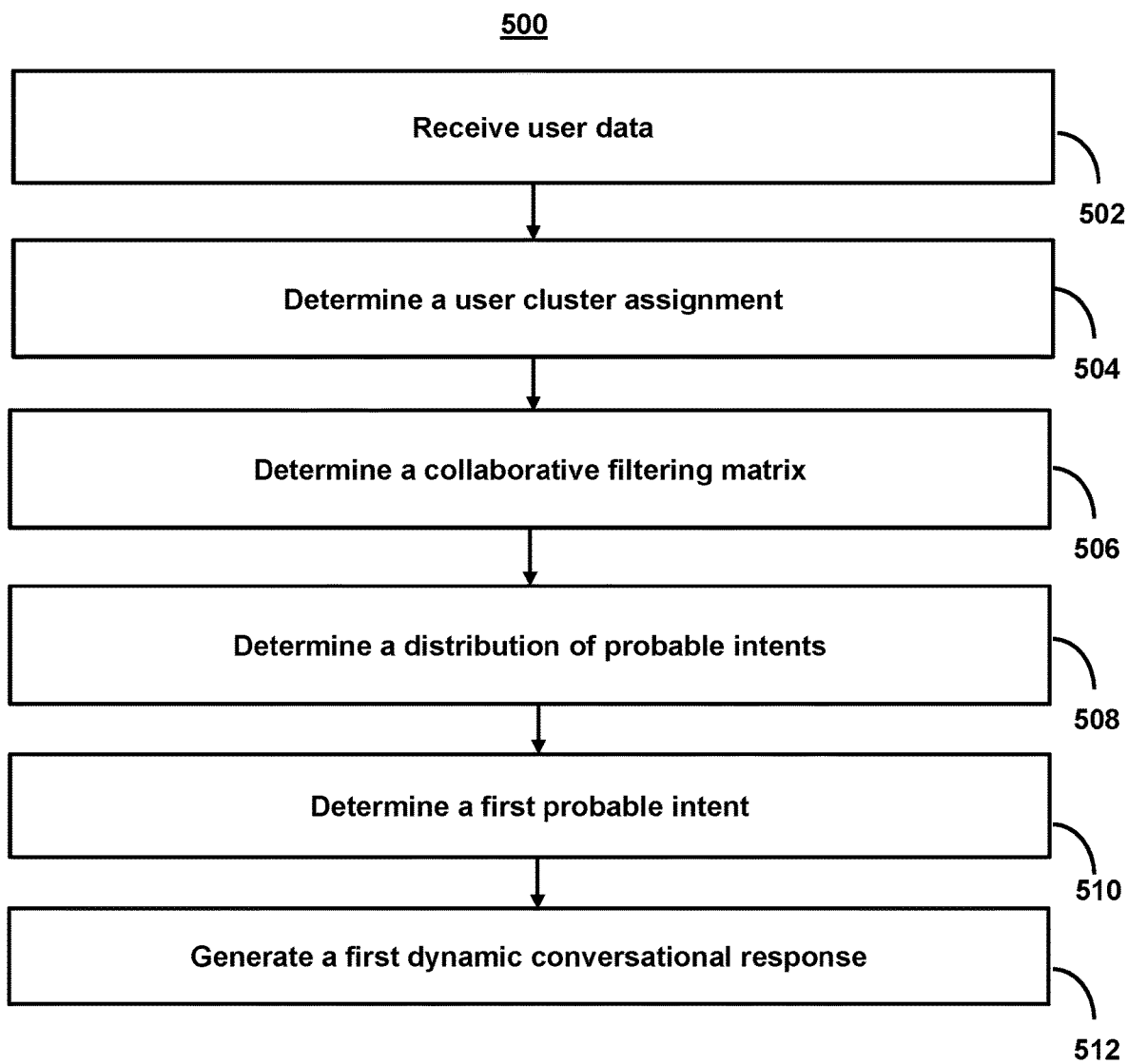
FIG. 5 shows a flowchart of the steps involved in generating dynamic conversational responses using cluster-level collaborative filtering matrices, in accordance with one or more embodiments.

FIG. 5 shows a flowchart of the steps involved in generating dynamic conversational responses using cluster-level collaborative filtering matrices, in accordance with one or more embodiments. For example, the system may use process 500 (e.g., as implemented on one or more system components described in FIG. 3) in order to generate dynamic conversational responses.

At step 502, process 500 (e.g., using one or more components described in system 300 (FIG. 3)) receives user data. For example, the system may receive multi-modal user data in response to a user interacting with a user interface. For example, the multi-modal user data comprises information about the user, cohort (or cluster) assignment, channel information, and/or a selected intent of the user. For example, the system may receive user data in response to a user interacting with a user interface (e.g., user interface 100 (FIG. 1)). The user data may describe one or more characteristics of a user, a user device, and/or one or more interactions of the user with a user device and/or application generating responses.

In some embodiments, the system may generate a feature input. For example, the system may generate a first feature input based on the user data. The feature input may comprise a column of data (e.g., an input set) that represents characteristics of user data from which the system may use to select a cluster assignment for the user. Alternatively or additionally, the system may include a feature input layer that receives the feature input and applies data normalization. For example, the system may extract a vector of continuous numbers from the user data, wherein determining the user cluster assignment for the user based on the user data comprises determining the user cluster assignment based on the vector of continuous numbers.

At step 504, process 500 (e.g., using one or more components described in system 300 (FIG. 3)) determines a user cluster assignment. For example, the system may determine a user cluster assignment for the user based on the user data. The system may generate a feature input. For example, the system may generate a first feature input based on the user data. The feature input may comprise a column of data (e.g., an input set) that represents characteristics of user data from which the system may use to select a cluster assignment for the user. Alternatively or additionally, the system may include a feature input layer that receives the feature input and applies data normalization.

In some embodiments, the system may determine a cluster assignment for the user based on a latent representation or embedding of training data. Additionally or alternatively, the system may use hard or soft clustering. In hard clustering, each user is assigned one cluster assignment. In soft clustering, each user receives a probability intent for all cluster assignments. That is, in hard clustering, each data point either belongs to a cluster assignment completely or not. In soft clustering, instead of putting each data point into a separate cluster assignment, a probability or likelihood of that data point to be in those cluster assignments is assigned. In hard clustering, one of the K values is 1 and the rest are 0. In soft clustering, all values can be non zeros and summed to 1. The system may use a soft clustering approach as it may be more consistent with a model when combined in the final fully connected layers.

For example, the system may determine an embedding for the user based on the user data, wherein the embedding comprises a vector of embedded real values. The system may then determine, using an unsupervised clustering algorithm, to assign the user to a first user cluster based on the embedding. In another example, the system may determine, using an unsupervised clustering algorithm, a distribution of cluster probabilities for the user based on the embedding.

The system may determine a user cluster assignment for the user based on the first feature input, wherein the first user cluster assignment comprises users having a first actual intent. The system may cluster the users based on similarities of intent and/or user characteristics. For example, the system may retrieve these characteristics (e.g., characteristics of the cluster and the user) and compare them.

For the comparison, the system may use multiple types of optical character recognition and/or fuzzy logic. For example, when comparing multiple data fields (e.g., as contained in databases described below). For example, after the content-recognition module or algorithm translates text, video, and/or audio recordings into text, the system may cross-reference the translated text with a database to determine whether or not the translated text corresponds to text in a database that corresponds to characteristics of users in a cluster.

For example, the system may arrange the text into data fields and cross-reference the data fields with other data fields (e.g., in a lookup table database) corresponding to possible values associated with user and/or cluster characteristics. Using fuzzy logic, the system may determine two fields and/or values to be identical even though the substance of the data field or value (e.g., two different spellings) is not identical. In some embodiments, the system may analyze particular data fields of a data structure for particular values or text. The data fields could be associated with characteristics, other user data, and/or any other information required for the function of the embodiments described herein. Furthermore, the data fields could contain values (e.g., the data fields could be expressed in binary or any other suitable code or programming language).

In some embodiments, the system may put additional requirements on cluster assignments. For example, the system may determine a number of the plurality of cluster assignments. The system may then assign each user a vector of values, a number of the values in the vector equals the number of the plurality of cluster assignments, and wherein the values sum to one, and wherein each value of the values corresponds to a probability that the user correspond to a respective cluster assignment.

At step 506, process 500 (e.g., using one or more components described in system 300 (FIG. 3)) determines a collaborative filtering matrix. For example, the system may determine a collaborative filtering matrix of intent probabilities for cluster assignments, wherein the collaborative filtering matrix is based on actual intents of a subset of users. In some embodiments, the subset of users may be based on a threshold number of user interactions that resulted in determinations of actual intents of users that were most recently received. For example, the collaborative filtering matrix may represent a dynamic, moving window of recently confirmed actual intents.

For example, the system may determine a collaborative filtering matrix of intent probabilities for cluster assignments, wherein the collaborative filtering matrix of intent probabilities for cluster assignments is for a subset of users corresponding to the first user cluster, and wherein the collaborative filtering matrix of intent probabilities for cluster assignments is based on actual intents of the subset of users during a first time period. For example, the system may determine a distribution of the probabilities of intents. The distribution may correspond to a multivariate analysis of a probability of a plurality of intents.

Additionally or alternatively, when determining the collaborative filtering matrix of intent probabilities for cluster assignments, the system may determine a respective number of users in each of the plurality of clusters, compare each respective number to a threshold number, and determine the collaborative filtering matrix of intent probabilities for cluster assignments in response to determining that each respective number equals or exceeds the threshold number. For example, the system may set a threshold based on the popularity of the particular intent.

Additionally or alternatively, when determining the collaborative filtering matrix of intent probabilities for cluster assignments, the system may determine a number of users in the first user cluster over a period of time, determine a rate of change of the number of users in the first user cluster over the period of time, compare the rate of change to a threshold rate of change, and determine the collaborative filtering matrix of intent probabilities for cluster assignments in response to determining that the rate of change equals or exceeds the threshold rate of change. For example, the system may set a threshold based on if an intent has had a dramatic rise in popularity.

At step 508, process 500 (e.g., using one or more components described in system 300 (FIG. 3)) determines a distribution of probable intents. For example, the system may determine, for the user, a distribution of probable intents from a plurality of distributions of probable intents based on the user data, wherein the plurality of distributions of probable intents are based on actual intents of users having one of a plurality of cluster assignments over a time period. This distribution may represent a historic distribution based on historic intents for users and/or cluster assignments.

Additionally or alternatively, the determination may include comparing the distribution to a threshold distribution. For example, when determining the distribution, the system may determine a number of users in the distribution. The system may then compare the number to a threshold number. The system may then determine the distribution in response to determining that the number equals or exceeds the threshold number. For example, the system may set a threshold based on a total number of users for which an intent has been determined to prevent a cold-start problem (e.g., the model does not yet have enough information to make an accurate prediction).

At step 510, process 500 (e.g., using one or more components described in system 300 (FIG. 3)) determines a first probable intent. For example, the system may determine a first probable intent of the user based on a weighted average of the collaborative filtering matrix and the distribution. For example, the system may adjust the weight given to predictions from the collaborative filtering matrix or the distribution based on how accurate recent predictions have been.

For example, the system may determine a first previous probable intent of the user based on the collaborative filtering matrix. The system may determine a second previous probable intent of the user based on the distribution. The system may determine an actual previous intent of the user based on a user selection of a previous dynamic conversational response. The system may determine that the actual previous intent corresponds to the first previous probable intent (e.g., determine that the actual previous intent corresponds to an intent with highest softmax probability prediction in the distribution). In response to determining that the actual previous intent corresponds to the first previous probable intent, the system may determine an increase to a weight attributed to the collaborative filtering matrix. The system may determine the weighted average of the collaborative filtering matrix and the distribution based on the increase to the weight attributed to the collaborative filtering matrix.

Additionally or alternatively, the system may determine a first previous probable intent of the user based on the collaborative filtering matrix. The system may determine a second previous probable intent of the user based on the distribution. The system may determine an actual previous intent of the user based on a user selection of a previous dynamic conversational response. The system may determine that the actual previous intent corresponds to the second previous probable intent (e.g., determine that the actual previous intent corresponds to a highest intent probability of the intent probabilities in the collaborative filtering matrix in a column associated with a cluster assignment, of the cluster assignments, with a highest probability). In response to determining that the actual previous intent corresponds to the second previous probable intent, the system may determine an increase to a weight attributed to the distribution. The system may determine the weighted average of the collaborative filtering matrix and the distribution based on the increase to the weight attributed to the distribution.

For example, the system may maintain a vector of per-intent weight numbers (e.g., one for historic learning (e.g., the distribution) and dynamic learning (e.g., the collaborative filtering matrix)). For example, if there are 100 intents, then the vector has 100 non negative pairs, from 0 to 1, numbers. Initially the all values are 0.5 to reflect steady state matching between historic learning (e.g., the distribution) and dynamic learning (e.g., the collaborative filtering matrix). For each user, the system compares the observed intent (e.g., a previously determined actual intent) expressed by a user with a prediction (e.g. intent with highest softmax probability prediction) for the historic learning (e.g., the distribution). If there is a match then, the system increases the weight for that intent. For collaborative filtering matrix, the system derives intent prediction by probability (e.g., intent with highest probability in the column associated with the highest assignment) and performs a similar update for same-intent weight. Each update is by 1/N, where N is the size of the recent experience moving window. The system may then normalize the weight-pair to have their sum equal to 1. The system may then use this pair as the new weights to calculate weighted average of probability prediction.

At step 512, process 500 (e.g., using one or more components described in system 300 (FIG. 3)) generates a first dynamic conversational response. For example, the system may generate for display, on the user interface, a first dynamic conversational response based on the first probable intent of the user. For example, the system may generate for display, on the user interface, a first dynamic conversational response based on the first probable intent of the user. Additionally or alternatively, the system may use the result of a user selection to update a model (e.g., a collaborative filtering matrix). For example, the system may receive a user selection of the first dynamic conversational response. The system may then determine an actual intent of the user based on the user selection. The system may then update the third model based on the actual intent.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-4 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic conversational responses based on historical and dynamically updated information, the method comprising: receiving multimodal user data in response to a user interacting with a user interface; generating a first feature input based on the user data; determining a first user cluster for the user based on the first feature input, wherein the first user cluster comprises users having a first actual intent; determining a collaborative filtering matrix of intent probabilities for cluster assignments, wherein the collaborative filtering matrix of intent probabilities for cluster assignments is for a subset of users corresponding to the first user cluster, and wherein the collaborative filtering matrix of intent probabilities for cluster assignments is based on actual intents of the subset of users during a first time period; generating a second feature input based on the user data; determining a second distribution of probable intents based on the second feature input, wherein the second distribution of probable intents is for the user, wherein the second distribution of probable intents is based on actual intents of users in a plurality of clusters during a second time period; determining a first probable intent of the user based on a weighted average of the first distribution and the second distribution; and generating for display, on the user interface, a first dynamic conversational response based on the first probable intent of the user.

2. The method of any one of the preceding embodiments, wherein determining the first user cluster for the user based on the first feature input comprises: inputting the first feature input into a first model, wherein the first model performs hybrid collaborative filtering based on similarities in predicted intents and user characteristics between users; receiving a first output from the first model; and determining the first user cluster based on the first output.

3. The method of any one of the preceding embodiments, wherein determining the collaborative filtering matrix of intent probabilities for cluster assignments comprises: inputting group data for users in the first user cluster into a second model, wherein the second model is an unsupervised model; receiving a second output from the second model; and determining the first distribution based on the second output.

4. The method of any one of the preceding embodiments, wherein determining the collaborative filtering matrix of intent probabilities for cluster assignments comprises: determining a number of users in the plurality of clusters; comparing the number to a threshold number; and determining the collaborative filtering matrix of intent probabilities for cluster assignments in response to determining that the number equals or exceeds the threshold number.

5. The method of any one of the preceding embodiments, wherein determining the collaborative filtering matrix of intent probabilities for cluster assignments comprises: determining a respective number of users in each of the plurality of clusters; comparing each respective number to a threshold number; and determining the collaborative filtering matrix of intent probabilities for cluster assignments in response to determining that each respective number equals or exceeds the threshold number.

6. The method of any one of the preceding embodiments, wherein determining the collaborative filtering matrix of intent probabilities for cluster assignments comprises: determining a number of users in the first user cluster over a period of time; determining a rate of change of the number of users in the first user cluster over the period of time; comparing the rate of change to a threshold rate of change; and determining the collaborative filtering matrix of intent probabilities for cluster assignments in response to determining that the rate of change equals or exceeds the threshold rate of change.

7. The method of any one of the preceding embodiments, wherein determining the second distribution of probable intents based on the second feature input comprises: inputting the second feature input into a third model, wherein the third model comprises supervised model components; receiving a third output from the third model; and determining the second distribution based on the third output.

8. The method of any one of the preceding embodiments, further comprising: receiving a user selection of the first dynamic conversational response; determining an actual intent of the user based on the user selection; and updating a third model based on the actual intent.

9. The method of any one of the preceding embodiments, wherein determining the first probable intent of the user based on the weighted average of the first distribution and the second distribution comprises: determining a number of users in the plurality of clusters; and determining a weight to apply in the weighted average based on the number of users in the plurality of clusters.

10. The method of any one of the preceding embodiments, wherein the multi-modal user data comprises information about the user, cohort assignment, channel information, or a selected intent of the user.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for generating dynamic conversational responses based on historical and dynamically updated information, the system comprising:
cloud-based storage circuitry configured to store:
group-wise dynamic intent predictions in a collaborative filtering matrix of intent probabilities for cluster assignments, wherein the collaborative filtering matrix is based on collaborative filtering of actual intents of a subset of users, wherein the subset of users is based on a threshold number of user interactions that resulted in determinations of actual intents of users that were most recently received, and wherein the collaborative filtering matrix is based on collaborative filtering of actual intents of a subset of users over a first time period, and wherein the collaborative filtering matrix denotes a set of the subset of users that are determined to be similar to a user and that had a first actual intent of the actual intents during the first time period; and
a historical distribution of probable intents from a plurality of distributions of probable intents based on user data, wherein the plurality of distributions of probable intents are based on actual intents of users having one of a plurality of cluster assignments over a second time period, wherein the second time period is before the first time period;
cloud-based control circuitry configured to:
receive user data in response to the user interacting with a user interface, wherein the user data is multi-modal data;
extracting a vector of continuous numbers from the user data;
determine a user cluster assignment for the user based on the vector;
retrieve the collaborative filtering matrix of intent probabilities for cluster assignments;
retrieve, for the user, the historical distribution;
determine a first previous probable intent of the user by processing the user cluster assignment in the collaborative filtering matrix as a first feature input;
determine a second previous probable intent of the user by processing the user cluster assignment in the historical distribution as a second feature input;
determine an actual previous intent of the user based on a user selection of a previous dynamic conversational response;
compare the actual previous intent with the first previous probable intent;
in response to comparing the actual previous intent with the first previous probable intent, determine an adjustment to a first weight attributed to the collaborative filtering matrix;
compare the actual previous intent with the second previous probable intent;
in response to comparing the actual previous intent with the second previous probable intent, determine an adjustment to a second weight attributed to the historical distribution;
determine a weighted average of the collaborative filtering matrix and the historical distribution based on the adjustment to the first weight attributed to the collaborative filtering matrix and based on the adjustment to the second weight attributed to the historical distribution; and
determine a first probable intent of the user based on the weighted average; and
cloud-based input/output circuitry configured to:
generate for display, on the user interface, a dynamic conversational response based on the first probable intent of the user, wherein the dynamic conversational response comprises a text-string in a human-readable format.

2. A method for generating dynamic conversational responses using cluster-level collaborative filtering matrices, the method comprising:
receiving user data in response to a user interacting with a user interface during a first time period, wherein the user data is multi-modal data;
determining a user cluster assignment for the user based on the user data;
determining a group-wise dynamic intent predictions in a collaborative filtering matrix of intent probabilities for cluster assignments, wherein the collaborative filtering matrix is based on collaborative filtering of actual intents of a subset of users over the first time period, and wherein the collaborative filtering matrix denotes a set of the subset of users that are determined to be similar to the user and that had a first actual intent of the actual intents during the first time period;

determining, for the user, a historical distribution of probable intents from a plurality of distributions of probable intents based on the user data, wherein the plurality of distributions of probable intents are based on actual intents of users having one of a plurality of cluster assignments over a second time period, wherein the second time period is before the first time period;

determining a first previous probable intent of the user by processing the user cluster assignment in the collaborative filtering matrix as a first feature input;

determining a second previous probable intent of the user by processing the user cluster assignment in the historical distribution as a second feature input;

determining an actual previous intent of the user based on a user selection of a previous dynamic conversational response;

comparing the actual previous intent with the first previous probable intent;

in response to comparing the actual previous intent with the first previous probable intent, determining an adjustment to a first weight attributed to the collaborative filtering matrix;

comparing the actual previous intent with the second previous probable intent;

in response to comparing the actual previous intent with the second previous probable intent, determining an adjustment to a second weight attributed to the historical distribution;

determining a weighted average of the collaborative filtering matrix and the historical distribution based on the adjustment to the first weight attributed to the collaborative filtering matrix and based on the adjustment to the second weight attributed to the historical distribution;

determining a first probable intent of the user based on the weighted average; and generating for display, on the user interface, a first dynamic conversational response based on the first probable intent of the user.

3. The method of claim 2, wherein determining the user cluster assignment for the user based on the user data, further comprises:

determining an embedding for the user based on the user data, wherein the embedding comprises a vector of embedded real values; and determining, using an unsupervised clustering algorithm, to assign the user to a first user cluster based on the embedding.

4. The method of claim 2, wherein determining the user cluster assignment for the user based on the user data, further comprises:

determining an embedding for the user based on the user data, wherein the embedding comprises a vector of embedded real values; and determining, using an unsupervised clustering algorithm, a distribution of cluster probabilities for the user based on the embedding.

5. The method of claim 2, wherein determining the user cluster assignment for the user based on the user data further comprises:

determining a number of the plurality of cluster assignments; and assigning each user a vector of values, a number of the values in the vector equals the number of the plurality of cluster assignments, and wherein the values sum to one, and wherein each value of the values corresponds to a probability that the user correspond to a respective cluster assignment.

6. The method of claim 2, wherein the subset of users is based on a threshold number of user interactions that resulted in determinations of actual intents of users that were most recently received.

7. The method of claim 2, wherein determining that the actual previous intent corresponds to the first previous probable intent comprises determining that the actual previous intent corresponds to an intent with highest softmax probability prediction in the historical distribution.

8. The method of claim 2, wherein determining that the actual previous intent corresponds to the second previous probable intent comprises determining that the actual previous intent corresponds to a highest intent probability of the intent probabilities in the collaborative filtering matrix in a column associated with a cluster assignment, of the cluster assignments, with a highest probability.

9. The method of claim 2, further comprising extracting a vector of continuous numbers from the user data, wherein determining the user cluster assignment for the user based on the user data comprises determining the user cluster assignment based on the vector of continuous numbers.

10. A non-transitory, computer readable medium for generating dynamic conversational responses using cluster-level collaborative filtering matrices, comprising instructions that when executed by one or more processors, causes operations comprising:

receiving user data in response to a user interacting with a user interface during a first time period, wherein the user data is multi-modal data;

determining a user cluster assignment for the user based on the user data;

determining group-wise dynamic intent predictions in a collaborative filtering matrix of intent probabilities for cluster assignments, wherein the collaborative filtering matrix is based on collaborative filtering of actual intents of a subset of users over the first time period, and wherein the collaborative filtering matrix denotes a set of the subset of users that are determined to be similar to the user and that had a first actual intent of the actual intents during the first time period;

determining, for the user, a historical distribution of probable intents from a plurality of distributions of probable intents based on the user data, wherein the plurality of distributions of probable intents are based on actual intents of users having one of a plurality of cluster assignments over a second time period, wherein the second time period is before the first time period;

determining a first previous probable intent of the user by processing the user cluster assignment in the collaborative filtering matrix as a first feature input;

determining a second previous probable intent of the user by processing the user cluster assignment in the historical distribution as a second feature input;

determining an actual previous intent of the user based on a user selection of a previous dynamic conversational response;

comparing the actual previous intent with the first previous probable intent;

in response to comparing the actual previous intent with the first previous probable intent, determining an adjustment to a first weight attributed to the collaborative filtering matrix;

determining that the actual previous intent has a degree of correspondence with the second previous probable intent;

in response to comparing the actual previous intent with the second previous probable intent, determining an adjustment to a second weight attributed to the historical distribution;

determining a weighted average of the collaborative filtering matrix and the historical distribution based on the adjustment to the first weight attributed to the collaborative filtering matrix and based on the adjustment to the second weight attributed to the historical distribution;

determining a first probable intent of the user based on the weighted average; and generating for display, on the user interface, a first dynamic conversational response based on the first probable intent of the user.

11. The non-transitory, computer readable medium of claim 10, wherein determining the user cluster assignment for the user based on the user data, further comprises:

determining an embedding for the user based on the user data, wherein the embedding comprises a vector of embedded real values; and determining, using an unsupervised clustering algorithm, to assign the user to a first user cluster based on the embedding.

12. The non-transitory, computer readable medium of claim 10, wherein determining the user cluster assignment for the user based on the user data, further comprises:

determining an embedding for the user based on the user data, wherein the embedding comprises a vector of embedded real values; and determining, using an unsupervised clustering algorithm, a distribution of cluster probabilities for the user based on the embedding.

13. The non-transitory, computer readable medium of claim 10, wherein determining the user cluster assignment for the user based on the user data further comprises:

determining a number of the plurality of cluster assignments; and assigning each user a vector of values, a number of the values in the vector equals the number of the plurality of cluster assignments, and wherein the values sum to one, and wherein each value of the values corresponds to a probability that the user correspond to a respective cluster assignment.

14. The non-transitory, computer readable medium of claim 10, wherein the subset of users is based on a threshold number of user interactions that resulted in determinations of actual intents of users that were most recently received.

15. The non-transitory, computer readable medium of claim 10, wherein determining that the actual previous intent corresponds to the first previous probable intent comprises determining that the actual previous intent corresponds to an intent with highest softmax probability prediction in the historical distribution.

16. The non-transitory, computer readable medium of claim 10, wherein determining that the actual previous intent corresponds to the second previous probable intent comprises determining that the actual previous intent corresponds to a highest intent probability of the intent probabilities in the collaborative filtering matrix in a column associated with a cluster assignment, of the cluster assignments, with a highest probability.

\* \* \* \* \*